No. 792,579. PATENTED JUNE 20, 1905.
G. H. BARSCHOW.
FOLDING GO-CART.
APPLICATION FILED NOV. 28, 1904.
3 SHEETS—SHEET 3.
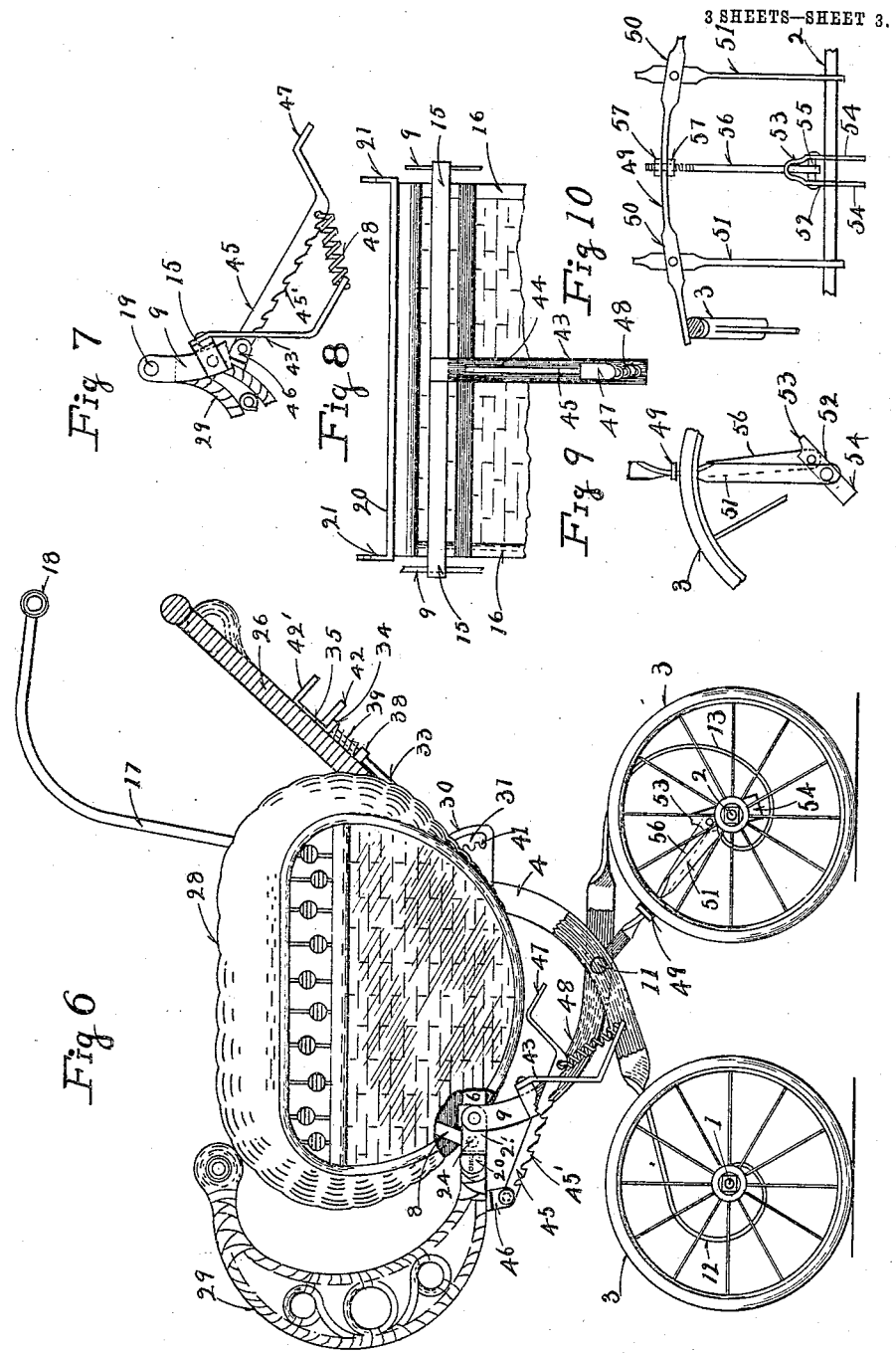
WITNESSES
M. A. Duquett
Grace Cowdrick.
INVENTOR
George H Barschow
BY Robt B Wilson
ATTORNEY No. 792,579.　　　　　　　　　　　　　　　　　　　　　　　　Patented June 20, 1905.

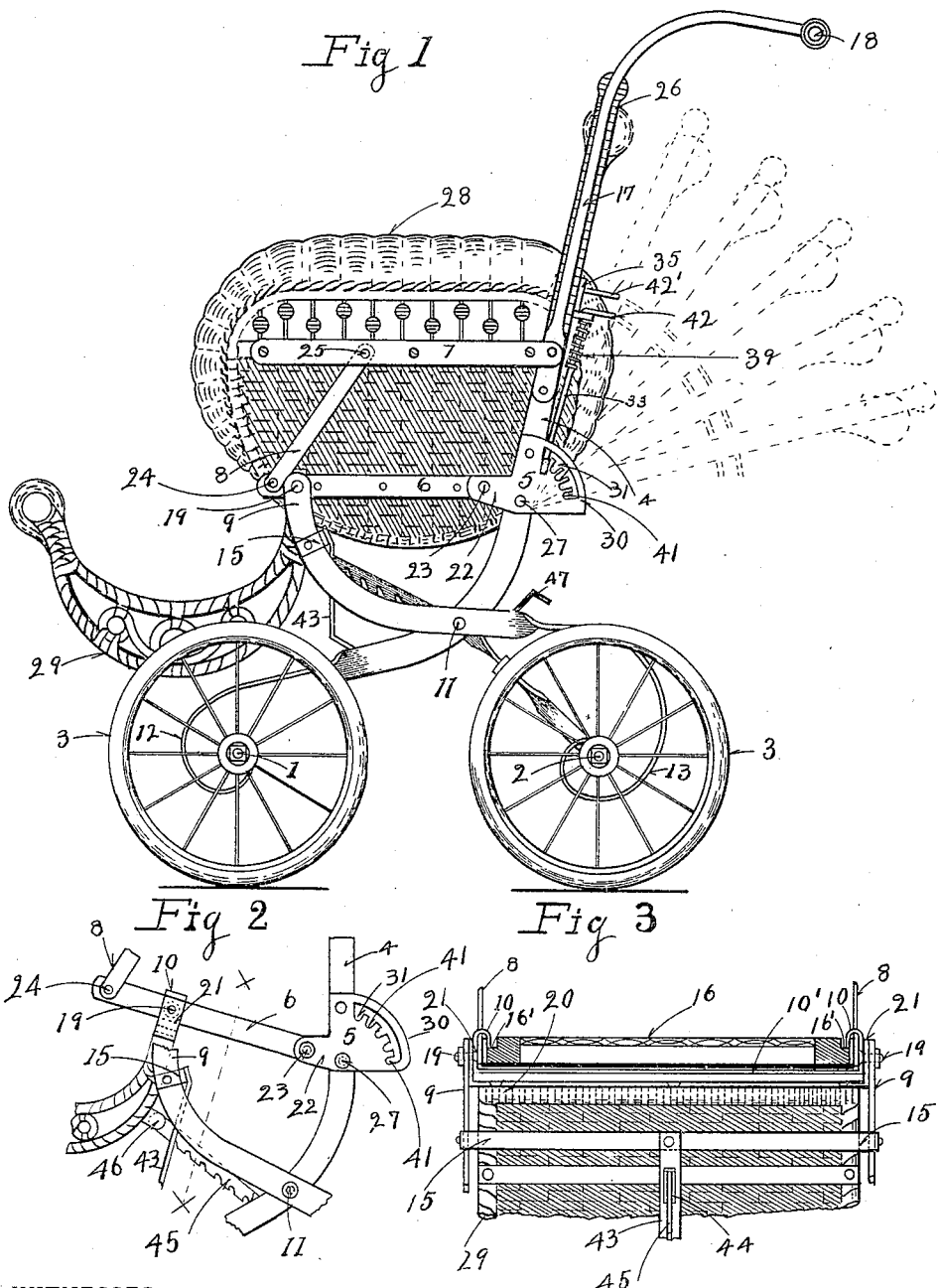

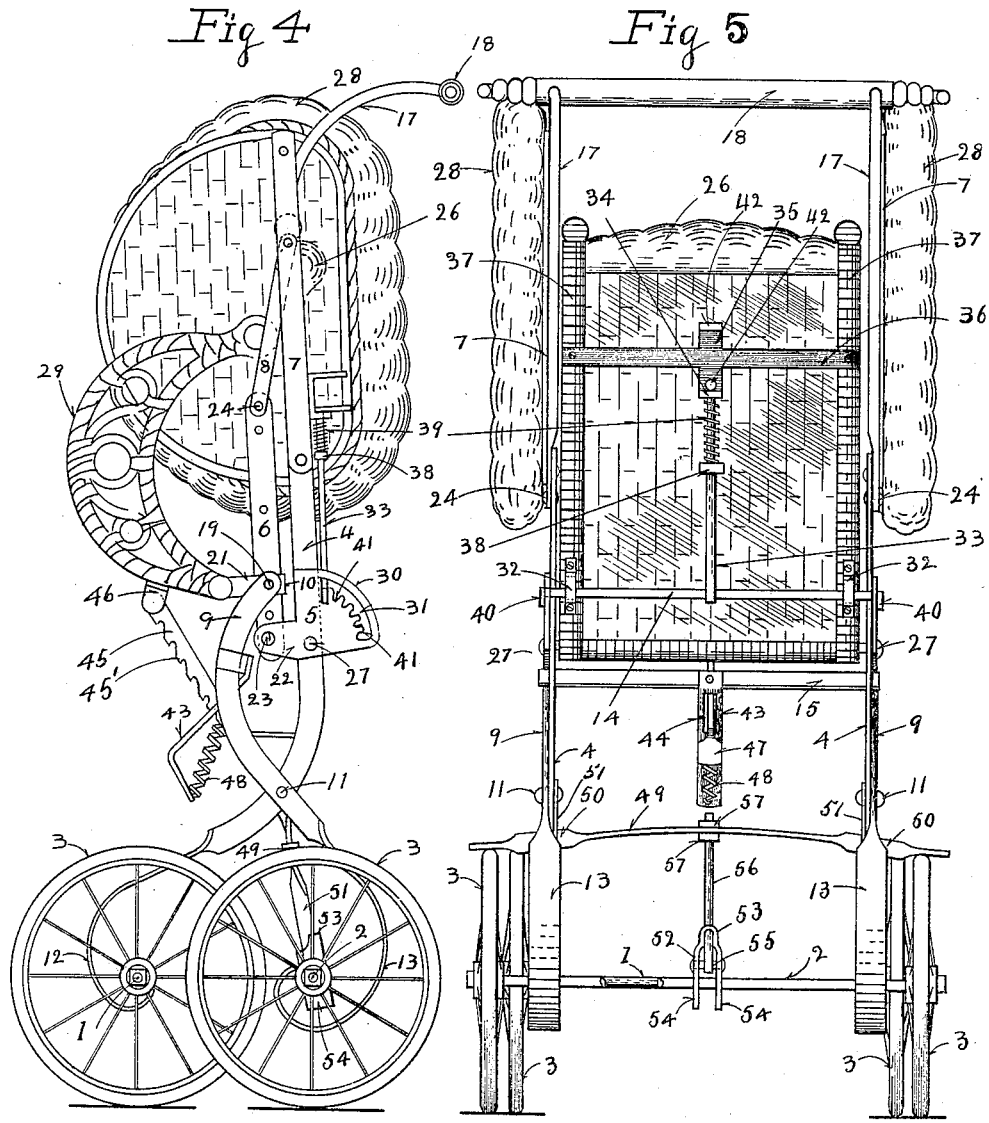

UNITED STATES PATENT OFFICE.

GEORGE H. BARSCHOW, OF TOLEDO, OHIO, ASSIGNOR TO THE AMERICAN METAL WHEEL & TOY CO., OF TOLEDO, OHIO.

FOLDING GO-CART.

SPECIFICATION forming part of Letters Patent No. 792,579, dated June 20, 1905.

Application filed November 28, 1904. Serial No. 234,504.

*To all whom it may concern:*

Be it known that I, GEORGE H. BARSCHOW, a citizen of the United States, residing at Toledo, in the county of Lucas and State of Ohio, have invented a new and useful Improvement in Folding Go-Carts, of which the following is a specification.

My invention relates to a folding go-cart, and has for its object to provide a convenient vehicle of the kind, the parts of which are readily folded together into a small compass from its normal position for use and that may be readily adjusted and locked by the attendant in various positions from a normal sitting position for the occupant to full recumbent or into folded-up position or that may be locked against movement on its wheels without necessity of the attendant releasing the handle of the vehicle or moving from the normal pushing position in rear of the vehicle. I accomplish these objects by constructing a go-cart as hereinafter described, and illustrated in the drawings, in which—

Figure 1 is a view in side elevation of my go-cart in its normal position for use with one of the wicker sides detached from a folding arm to permit interior view and showing in dotted lines the various positions the back may be made to assume relative to the seat. Fig. 2 is a side view of articulated parts in partly-folded position with portions broken away. Fig. 3 is a rear view in cross-section on line X X of Fig. 2 to more clearly show parts below the seat. Fig. 4 is a view in side elevation of my go-cart in a folded and locked position with one wicker side removed to more clearly show folded positions of arms, seat, and dash and the locking mechanism. Fig. 5 is a view in rear elevation of the same. Fig. 6 is a side view of my go-cart, showing the back arranged for partial recumbent position and with the folding dash and foot-rest at full elevation and in position locking all the folding parts against folding or unfolding, except by releasing and partially lowering the dash. Fig. 7 is a detail side view of the dash elevating and locking mechanism. Fig. 8 is a rear view of the same. Fig. 9 is a detail side view of the brake mechanism with the brake "open," and Fig. 10 is a rear view of the same with the brake set.

In the drawings, 1 and 2 respectively represent the front and rear axles, on which are mounted the wheels 3. The front axle 1 is of reduced length relative to the rear axle 2 to permit the wheels of the front axle in folding to pass between the wheels of the rear axle, as shown in Figs. 4 and 5, the wheels of both axles being preferably of equal diameter. Upon the axles is mounted a chair-shaped articulated body-frame comprising two cross-connected side frames each having a back bar 4 provided with a seat-plate 5, a seat-bar 6, pivoted to the seat-plate, an arm 7, pivoted to the top portion of the back bar, the link-bar 8, pivotally connecting the seat-bar 6 with the arm 7, and the front bar 9, pivotally connected at its upper end to a slide-hook 10, formed on the slide-bar 10' and hooked over the seat-bar 6, the back bar 4 of each side frame below the seat-plate 5 being curved forward and the front bar 9 rearward from its connections with the seat-bar, said front and back bars crossing side by side and being pivoted together at their crossing by the pivot 11. The bars 4 forward of and the bars 9 rearward of the pivots 11 are each quarter-twisted and then curved to form the involute springs 12 and 13, by which they are respectively connected to the front and rear axles near the wheels 3.

The bars 4 of the articulated side frames, in addition to the front axle, are cross-connected by the lock-rod 14, extending through the seat-plates 5, the bars 9, in addition to the rear axle, are cross-connected near their top ends by the bar 15, and the seat-bars 6 are cross-connected by the seat-frame 16, as shown in Fig. 3, and the slide-bar 10'.

To the top end portions of the back bars 4 are secured in extension thereof the handles 17, the top portions of which are curved rearward and connected by the handle-bar 18. The hook portions 10 of the slide-bar 10' are provided with the pivot-pins 19, on which are pivotally secured the upper ends of the front bars 9, and between the bars 9 and the hook portions 10 is pivoted the cross-bar 20 by its angled end portions 21, suitably pierced to receive the pivots 19.

The seat-plates 5 have portions 22 extending forward of the back bars 4, to which the seat-bars 6 are pivoted by the pivots 23, and the lower end portions of the bars 8 are pivoted to the outer end portions of the seat-bars by the pivots 24, and their upper end portions are pivoted to the arm-bars 7 a short distance forward of their longitudinal centers by the pivots 25. To the articulated skeleton frame thus constructed the wicker-work parts constituting the body of the vehicle are severally attached as follows: To the seat-bars 6 the seat-frame 16, having the side rabbets 16' to form grooves for the hook 10, to the back bars 4 and seat-plates 5 is pivoted the back 26 by the pivots 27, to the arms 7 the sides 28, and to the pivoted cross-bar 20 the swinging foot-rest and dash 29.

The back 26 is adapted to swing between the bars 4 and their handle extensions 17, and to secure the back in various positions the seat-plates 5 are provided with the enlarged rearward extensions 30, in which are provided the arc rack-slots 31, through which the end portions of the lock-rod 14 extend.

The lock-rod 14 is movably secured to the back 26 by the slotted cleats 32, and central of the rod 14 there is suitably connected thereto a lifting-rod 33, which extends upward therefrom along the back and through a suitable perforation in the lower arm 34 of the bracket-clip 35, secured centrally of the cross-bar 36, which extends across the back and is suitably secured by its ends to the side posts 37 of the back. The upper end portion of the rod 33 is threaded, and the threaded portion is provided with an adjusting-nut 38, and there is mounted on the rod between the nut and clip-arm 34 a helical spring 39, by which the rod 33, and with it the rod 14, is normally depressed, with the hooked end portions 40 of the rod 14 in opposite radial indents 41 of the arc rack-slots 31 of the seat-plates 5, thereby securing and locking the back 26 in position substantially parallel with the radial plane of the indents, with which the rod 14 is engaged. The top end of the rod 33 is provided with the handle 42, which extends rearward parallel with the upper clip-arm 42'.

Central of the cross-bar 15 there is secured thereto an arm 43, which projects downward and rearward therefrom at a suitable angle for a distance and is then again angled rearward obtusely to the upper portion. The upper portion of the arm 43 is provided with the central longitudinal slot 44, through which extends the toothed lock-bar 45. The lock-bar 45 is pivotally secured by one end to a suitable bracket 46, secured to the under side of the swinging foot-rest and dash 29, and the teeth 45' of the bar are arranged to engage the arm 43 at the lower end of the slot 44 in a rearward movement of the lock-bar and to freely pass over the lower end of the slot in a forward movement of the bar. A portion of the free end of the lock-bar 45 is angled upward at an obtuse angle to the toothed body of the bar for a distance and then is again angled rearward on a line parallel with the body portion if extended to form a convenient treadle portion 47, by which the dash may be raised or lowered from the rear of the vehicle. To insure the teeth engaging to lock the foot-rest at a desired elevation, the lock-bar is connected to the free end portion of the arm 43 by a helical spring 48, the tension of which yieldingly holds the teeth of the lock-bar in engagement with the arm at the lower end of the slot 44. Thus constructed the foot-rest and dash may be raised from a pendent position, as shown in Fig. 1, and locked in any desired position in the arc of its movement up to the position of the dash shown in Fig. 6.

To lock the vehicle against movement on its wheels, there is provided the flat brake-bar 49, which is of a length to extend over both the rear wheels 3. Opposite the rear springs 13 portions 50 of the brake-bar are quarter-twisted at right angles to the end and center portions, and the portions 50 are pivotally riveted to bars 51, which are mounted by their lower ends on the rear axle and by their upper ends on the inner ends of the pivots 11 by suitable perforations in the end portions of the bars, which are quarter-twisted from the main body portions of the bars for such engagement and adapt the bars for the attachment of portions 50 of the brake-bar. The brake-bar 49 is so attached to the bars 51 that the outer end portions of the bar in its normal position will extend over and beyond the wheels of the rear axle without touching the wheels. To compress the end portions of the brake-bar on the wheels, there is pivotally mounted central on the rear axle a treadle-yoke 52, formed of a flat bar bent to form a U-shaped neck portion 53 in the bow of the yoke, with the arms 54 extending parallel, which are provided with alined perforations near the longitudinal centers of the arms by which the yoke is pivoted on the axle. Above and parallel with the axle the arms are cross-connected by a pivot-bolt 55, upon which is suitably pivoted an eyebolt 56, having its free end portion threaded and extended through a suitable orifice central of the brake-bar. The eyebolt 56 has run thereon on opposite sides of the brake-bar the nuts 57, by which the eyebolt is secured to the brake-bar, so that the combined lengths of the yoke from its pivotal connection with the axle to its pivotal connection with the eyebolt and of the eyebolt from its pivotal connection with the yoke to its connection with the brake-bar will be greater than the normal distance of the brake-bar from the axle, whereby when the brake-bar is in its normal unflexed position the yoke and the eyebolt will form an angle, as shown in Fig. 9. The U-shaped neck portion 53 is cut away at the under edge, as shown in Figs. 6 and 9, to permit the yoke-arms and the eyebolt to be forced into extension substantially in the same plane by pressing on the upper portion of the yoke, thereby forcing the central portion of the brake-bar into the bowed position (shown in Figs. 5 and 10,) whereby the end portions of the brake-bar are compressed on the rims of the rear wheels, as shown in Figs. 1, 4, and 5. The brake is released by pressing with the foot on the rear ends of the yoke-arms, which operate as levers to raise the pivotal connection between the yoke and the eyebolt out of the common plane of the brake-bar and the axle, thereby returning the brake-bar to its normal position and disengaging its end portions from the wheels.

Thus constructed the go-cart may be folded from the normal position for use (shown in Fig. 1) into the position shown in Figs. 4 and 5 without releasing the handle-bar by first partially raising and locking the foot-rest and dash, which may be done by pressing the treadle of the locking-bar 45 with the foot, after which by placing a foot on the rear axle and lifting on the handle-bar the front wheels will be drawn between the rear wheels, the movement of the front axle toward the rear axle causing a like movement of the upper ends of the front bars 9 toward the back bars 4, thereby causing the seat-bars to fold upward and rearward, the difference in the arcs of movement between the bars 9 and the seat-bars 6 causing the inward shifting of the hooks 10 from the outer end portions of the seat-bars, as shown in Fig. 1, toward the pivotal attachment of the seat-bars to the seat-plates 5, as shown partially completed in Fig. 2 and fully completed in Fig. 4, the movement of the seat-bars by means of the link-bars 8 in turn causing the arms 7 to fold upward against the back 26 and to carry with them the wicker sides in position as shown in Figs. 4 and 5. In the inward and upward movement of the hooks 10 the relation of the foot-rest and dash thereto as established by the lock-bar 45 is not changed, and it is also moved upward and rearward toward the back, but not fully closed against it. The dash, however, is brought within reach from the rear of the vehicle and may be drawn over against the back, thereby causing the last tooth of the lock-bar 45 to be brought into engagement with the arm 43, whereby the dash is locked in such position. When so folded, all the parts may be locked against unfolding by setting the brake on the rear wheels.

By pivoting the seat-bars to the extension 22 of the seat-plates 5 room is provided for the folding of the seat without removing the quilted cushion that is usually provided and which is secured to the top of the back and extends down the back and over the seat.

In Fig. 6 the vehicle is shown with the back and foot-rest adjusted for a recumbent position of the occupant. When the foot-rest is locked in this raised position, with the seat in its normal position, the bar 20, to which the foot-rest is attached, is shouldered against the front of the seat, and in such position it forms a lock against the folding of the vehicle. In this locked position the vehicle may be trundled down steps or over street-curbs and the like without any liability of a partial folding that would disturb a sleeping child in the vehicle. It is manifest also that by jointly grasping the handle 42 and the clip-arm 42' with one hand the back may be readily unlocked and raised or lowered to any desired position independent of the other folding movements and that it will be automatically locked in such position by releasing the handle.

From the foregoing it will be seen that I have fully accomplished the objects of my invention as set forth and have produced a go-cart having a commodious wicker-work body and that is adapted without releasing the handle-bar to be conveniently and readily adjusted and secured in various folded and unfolded positions as required for the comfort of the occupant and that may be as readily and conveniently folded up and locked in a small compass for convenience of carriage or storage, the flexing of the brake-bar, in addition to the pressure on the rear wheels, causing such a binding pressure of the brake-supporting bars 51 on the back bars 4 and the front bars 9 at their pivotal crossings at the pivots 11 that the folded-up parts are frictionally held against unfolding.

What I claim to be new is—

1. In a folding go-cart the combination with a folding body-frame comprising back bars having handle extensions, of plates secured to the back bars, said plates having rearward projections provided with arc-slots having indents radial to the arcs of the slots, a back pivoted at its lower end to the back bars between the plates, and adapted to swing between the back bars and their handle extensions, a lock-rod movably secured to and across the back, said lock-rod having end portions extending through the arc-slots, adapted to enter the radial indents and support the back in various positions radial to the axes of its pivots, and a spring-pressed lift secured to the lock-rod and movably secured to the back, adapted to automatically compress the lock-rod into indents alined therewith, and to be moved to withdraw the lock-rod from the indents, substantially as set forth.

2. In a folding go-cart, the combination with a folding body-frame comprising pivotally cross-connected spring reach-bars supported on front and rear axles mounted on wheels, and a folding seat, seat-arms, and foot-rest, connected with the reach-bars, and adapted to be folded up thereby, of a pair of brake-supporting bars each connected by one end to the rear axle and at the opposite end to the pivotal connections of the spring reach-bars, a brake-bar cross-connected to the supporting-bars, parallel with the rear axle, and having end portions extending over the rear wheels, a treadle pivoted centrally on the rear axle, a bolt connected centrally of the brake-bar by one end portion and pivotally connected at the other end portion with the treadle between the axle and the brake-bar said bolt being normally out of the plane of the brake-bar and the axle, and adapted when forced into such plane by the treadle to spring the central portion of the brake-bar upward and the outer end portions of the brake-bar downward and thereby compress the end portions of the brake-bar on the rear wheels and the brake-supporting bars on the pivotal crossings of the reach-bars, substantially as set forth.

3. In a folding go-cart the combination with a folding body-frame comprising pivotally cross-connected front and back bars, the front bars having lower end spring portions connected to a rear axle, and back bars having lower end spring portions connected to a front axle, of seat-bars pivotally connected at one end to forward projections from the back bars, a seat-supporting cross-bar below the seat-bars having hook end portions engaging the upper edges of the seat-bars, pivot-pins pivotally connecting the hook portions of the cross-bar with the upper end portions of the front bars, a seat secured between the seat-bars, a swinging cross-bar having angled end portions pivotally secured to the pivot-pins of the hooks and adapted to swing into parallel alinement with the seat-bars, with the body of the bar abutting the seat, a cross-bar rigidly connecting the front bars below their pivotal connection with the hook portions of the seat cross-bar, a foot-rest and dash secured to the swinging cross-bar, a slotted lock-arm secured to the rigid cross-bar of the front arms, a bracket secured to the foot-rest and dash, a toothed lock-bar pivoted to the bracket and projecting through the slot of the lock-arm and having a treadle portion projecting rearward from the toothed portion, adapted to raise the foot-rest and dash, and a helical spring connecting the lock-arm with the lock-bar, adapted to automatically draw the teeth of the lock-bar into engagement with the lock-arm, substantially as and for the purpose set forth.

4. In a folding go-cart, the combination with a wheel-base comprising wheels mounted on front and rear axles, and a folding body-frame comprising pivotally cross-connected front and back bars, said front bars having lower end spring portions connected to the rear axle and said back bars having lower end spring portions connected to the front axle, of plates secured to the back bars and having portions extending forward of the bars, seat-bars pivoted to the extensions, arms pivoted to the back bars above the seat-bars, link-bars connecting the seat and arm bars, a seat secured between the seat-bars, a seat-supporting bar having end hook portions adapted to slide along the tops of the seat-bars, and having pivot-pins extending through the top end portions of the front bars, whereby when the upper portions of the front bars are moved toward the back bars, the seat-bars and the seat, and the arm-bars, will be folded upward toward the back bars, handle extensions secured to the back bars, a handle-bar cross-connecting the handle extensions, and seat sides secured to the outer sides of the arm-bars, said seat sides being adapted when the seat and arms are folded upward to be upended by the arms and pass outside and partially rearward of the back bars and their handle extensions.

In testimony whereof I have signed my name to this specification, in the presence of two subscribing witnesses, this 11th day of November, 1904.

GEORGE H. BARSCHOW.

Witnesses:
F. S. MACOMBER,
ANNA M. FRIEDRICHS.